US007421305B2

(12) United States Patent
Burges et al.

(10) Patent No.: US 7,421,305 B2
(45) Date of Patent: Sep. 2, 2008

(54) AUDIO DUPLICATE DETECTOR

(75) Inventors: Christopher J. C. Burges, Bellevue, WA (US); John C. Platt, Redmond, WA (US); Daniel Plastina, Sammamish, WA (US); Erin L. Renshaw, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 796 days.

(21) Appl. No.: 10/785,561

(22) Filed: Feb. 24, 2004

(65) Prior Publication Data

US 2005/0091275 A1    Apr. 28, 2005

Related U.S. Application Data

(60) Provisional application No. 60/514,490, filed on Oct. 24, 2003.

(51) Int. Cl.
*G06F 17/00* (2006.01)
(52) U.S. Cl. .......................................... 700/94; 704/238
(58) Field of Classification Search .......... 707/E17.101, 707/E17.102, E17.103; 704/238; 700/94
See application file for complete search history.

(56) References Cited

U.S. PATENT DOCUMENTS

| | | | |
|---|---|---|---|
| 5,913,208 A | 6/1999 | Brown et al. | |
| 6,434,520 B1 | 8/2002 | Kanevsky et al. | |
| 6,604,072 B2 | 8/2003 | Pitman et al. | |
| 6,615,209 B1 | 9/2003 | Gomes et al. | |
| 2002/0113824 A1 * | 8/2002 | Myers, Jr. | 345/810 |
| 2003/0125936 A1 * | 7/2003 | Dworzak | 704/211 |
| 2003/0191764 A1 * | 10/2003 | Richards | 707/100 |
| 2003/0212573 A1 | 11/2003 | Dorrance et al. | |
| 2004/0059933 A1 | 3/2004 | Levy | |
| 2004/0193642 A1 | 9/2004 | Allen et al. | |

FOREIGN PATENT DOCUMENTS

WO    WO 02/37316 A1    5/2002

OTHER PUBLICATIONS

Wu, An Introduction to Object-Oriented Programming with Java, WCB, McGraw-Hill (1999) at pp. 125-129, 502, 516-517.*
Christopher Burges, et al., Duplicate Detection and Audio Thumbnails with Audio Fingerprinting, Microsoft Research, 2004, 5 pages.
Chris J.C. Burges, et al., Identifying Audio Clips with RARE, MM'03, 2003, pp. 444-445, Berkeley, California, USA.
Christopher J.C. Burges, et al., Distortion Discriminant Analysis for Audio Fingerprinting, IEEE Transactions on Speech and Audio Processing, 2003, pp. 165-174, vol. 11-No. 3.
European Search Report for EP Application No. EP 04 10 4435, mailed Mar. 25, 2008, 50 pages.

* cited by examiner

*Primary Examiner*—Walter F Briney, III
(74) *Attorney, Agent, or Firm*—Amin, Turocy & Calvin, LLP

(57) ABSTRACT

The present invention relates to a system and methodology to facilitate automatic management and pruning of audio files residing in a database. Audio fingerprinting is a powerful tool for identifying streaming or file-based audio, using a database of fingerprints. Duplicate detection identifies duplicate audio clips in a set, even if the clips differ in compression quality or duration. The present invention can be provided as a self-contained application that it does not require an external database of fingerprints. Also, a user interface provides various options for managing and pruning the audio files.

12 Claims, 9 Drawing Sheets

AUDIO DUPLICATE DETECTOR

RELATED APPLICATIONS

This application claims priority to U.S. Provisional Patent Application Ser. No. 60/514,490, filed on Oct. 24, 2003 and entitled DUPLICATE DETECTION AND AUDIO THUMBNAILS WITH AUDIO FINGERPRINTING.

TECHNICAL FIELD

The present invention relates generally to computer systems, and more particularly to a system and method that employs audio fingerprints to automatically manage redundant or corrupted audio files.

BACKGROUND OF THE INVENTION

One of the current features supported by many modern software systems is the ability to store and play audio files. Many of these systems enable users to store and manage differing collections of audio files. As time passes however, many users become frustrated with the large numbers of files that inevitably take up larger amounts of storage space. Also, as collections become larger, it becomes more difficult and time consuming to retrieve and play desired audio information. Many systems offer software to help users manage these ever increasing volumes of audio information. For example, these systems may include an audio manager that supports popular audio file formats, including MP3, Ogg Vorbis (OGG), Windows Media Audio (WMA), MPC and MP+ files, and so forth. This enables users to catalog their entire collection of audio files and instantly search for favorite songs, browsing albums using the album cover as a thumbnail, creating reports and other useful features.

In addition to organizing audio files, these systems provide a set of tools to manage files by editing tags, changing names, editing lyrics, creating CDs, and looking up artist information, for example. Users can work with audio files stored on hard discs, CD-ROMs, network drives, ZIP drives or any other removable media. This includes tools that allow users to play multiple play lists and display images associated with each title. Additional features include automatically generated database statistics, personal ratings, sorting by genre, mood, year, and custom database queries.

Audio fingerprinting (AFP) has recently emerged as a powerful method for identifying audio, either in streams or in files. Several companies now offer music services based on audio fingerprinting. These services require that one or more fingerprints be extracted from the audio to be identified, and that these fingerprints be checked against a large database of previously-computed fingerprints.

Managing large audio collections is difficult, however, since it's not currently possible to quickly parse audio files (as opposed to images, for which thumbnails can be used). Users generally must rely on labeling, but even that is of limited help: often the labeling is inaccurate, but even with accurate labeling, identifying duplicate audio files in a typical PC collection is extremely time consuming. Therefore, there is a need for systems and methods that automatically identify duplicate audio files, and/or audio files that contain noise or have other problems, on a user's PC or other media device, and allowing users to manage their audio files more efficiently.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for detecting duplicate or corrupted audio files to facilitate management and removal of such files. Managing large audio collections is difficult since compared to images and text, for example, it is problematical to quickly parse large audio files. In the past, users have relied on labeling, which may be inaccurate. The present invention solves many of the drawbacks and shortcomings of conventional systems by providing tool for assisting the user in searching audio files, identifying files that may be duplicates of one another, identifying corrupted, noisy, or junk files, and facilitating removal of such files from a user's database. In one aspect, the user supplies two parameters to the system (the number of seconds (t) from the beginning of the audio in order to extract a fingerprint, and the size of a slop window (s)). The present invention then locates the user's audio files and computes a fingerprint based in part on (t) and (s). A user interface is provided to configure these and other parameters along with enabling users to remove duplicate or corrupted files that are automatically determined.

In one aspect of the present invention, an audio duplicate detector system is provided that includes a database for audio files that is processed by a duplicate detector. The duplicate detector includes one or more internal databases for holding intermediate results from an analyzer that processes the audio files in order to determine such aspects as whether or not a duplicate audio file exists or whether a file has been corrupted, for example. A fingerprint component and normalization component operate within the analyzer to determine whether portions of the audio files are duplicates of other files, whereby a match detector tags such portions as duplicates (or some other designation such as corrupt file or junk file). A user interface includes inputs for enabling users to input system parameters (e.g., detection analysis parameters) and select files for removal among other aspects. Outputs from the interface can include lists of audio files to remove from the user's database and configuration options for the system.

In general, a user selects a top-level directory (called 'root') from which to search in the database, and then starts the detector via the user interface. Typically, the user supplies two parameters (or more) to the system: how many seconds (T) into the audio file to extract respective fingerprints, and what size 'slop window' to use (S), wherein S is also measured in seconds. The detector then searches from the root directory down through subdirectories, and retrieves audio files, which it identifies by their extension. When the detector finds an audio file, it loads the file and computes a series of fingerprints, starting at T−S seconds into the file and ending at T+S seconds into the file. If none of those fingerprints match a fingerprint that is already in the database, the fingerprint computed at T seconds into the file is added to the database. In this manner, an audio file will cause either a single fingerprint to be added to the database (if no match is found), or no fingerprints to the database (if any match is found). In one example, fingerprints are computed that are generated from 6 seconds of audio, and that consist of 64 floating point numbers, together with a normalization factor (which is also a floating point number). As can be appreciated, other time values and number of floating point variables can be employed.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate automatic detection of duplicate and/or corrupted audio files in a database. Upon detection, the files can be tagged for subsequent removal from the database, if desired. In one aspect, a system for managing audio information includes a fingerprinting component to identify portions of audio files. A detector tags one or more of the audio files for potential removal from a data storage based upon a determined cost between the audio files. The detector can tag the audio files based upon the cost being below a predetermined threshold or based upon a lowest cost analysis. In another aspect, a user interface is provided for managing audio files. The interface includes a display component providing one or more options for potential audio files to remove from a database and an input component to select the options and configure an automated audio pruning component that determines the potential audio files for removal.

As used in this application, the terms "component," "object," "detector," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
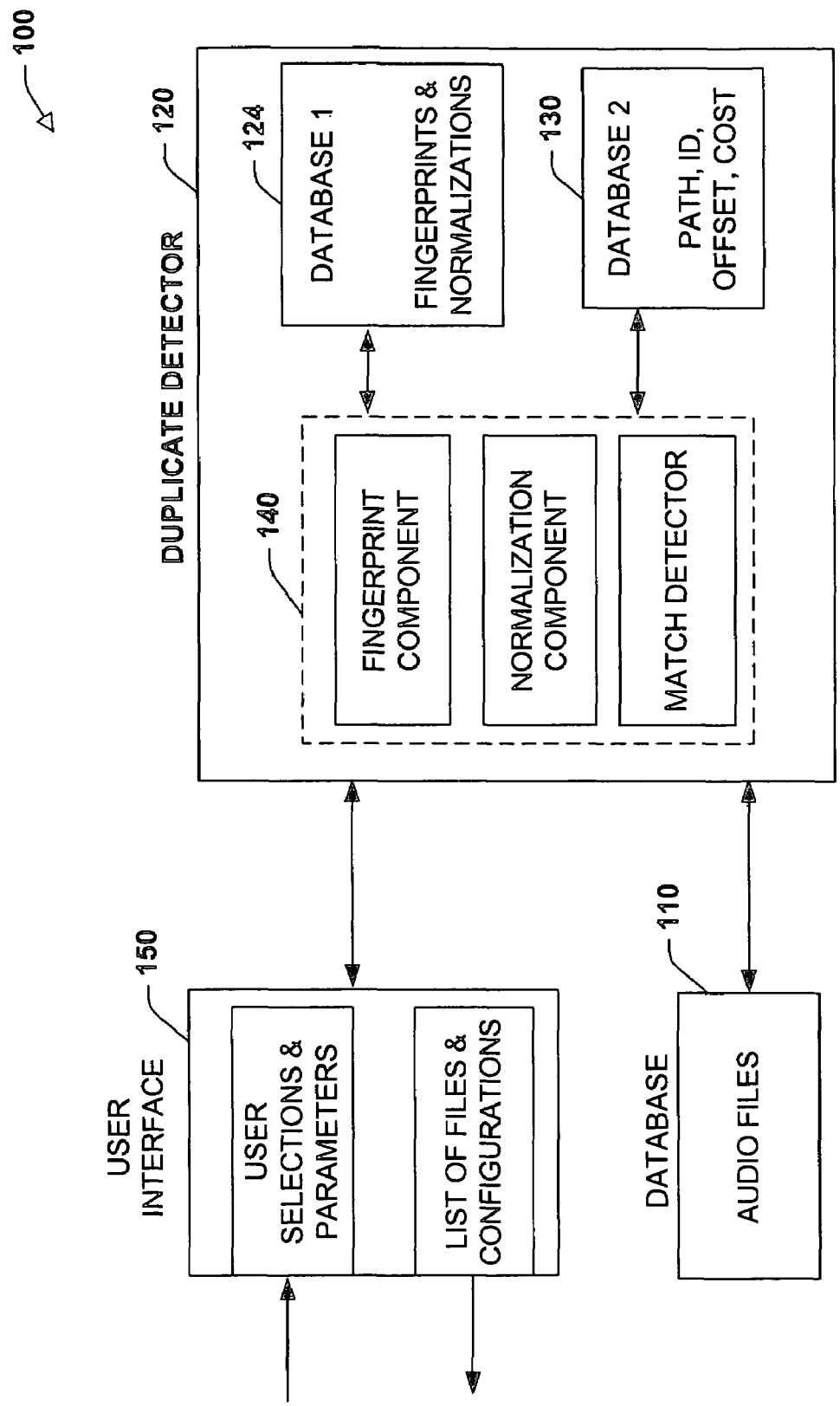
FIG. 1 is a schematic block diagram of an audio duplicate detector system in accordance with an aspect of the present invention.

Referring initially to FIG. 1, an audio duplicate detector system 100 is illustrated in accordance with an aspect of the present invention. The system 100 includes a database 110 of audio files that is processed by a duplicate detector 120. The duplicate detector includes one or more internal databases 124 and 130 for holding intermediate results from an analyzer 140 that processes the audio files in order to determine such aspects as whether or not a duplicate audio file exists or whether a file has been corrupted, for example. A fingerprint component and normalization component operate within the analyzer 140 to determine whether portions of the audio files are duplicates of other files, wherein a match detector tags such portions as duplicates (or some other designation such as corrupt file or junk file). A user interface 150 includes inputs for enabling users to input system parameters (e.g., detection analysis parameters) and select files for removal among other aspects. Outputs from the interface 150 can include lists of audio files to remove and configuration options for the system 100, for example.

In one aspect, the fingerprint component employs a Robust Audio Recognition Engine (RARE) which is described in more detail below. In general, a user selects a top-level directory (called 'root') from which to search in the database 110, and then starts the detector 120 via the user interface 150. Typically, the user supplies two parameters (or more) to the system: how many seconds (T) into the audio file to extract respective fingerprints, and what size 'slop window' to use (S), wherein S is also measured in seconds and is described below. The detector 120 then searches from the root directory down through subdirectories, and retrieves audio files, which it identifies by their extension (e.g., .MP3, .WMA and .WAV files). When the detector 120 finds an audio file, it loads the file and computes a series of fingerprints, starting at T−S seconds into the file and ending at T+S seconds into the file. In one example, fingerprints are computed that are generated from 6 seconds of audio, and that consist of 64 floating point numbers, together with a normalization factor (which is also a floating point number). As can be appreciated, other time values and number of floating point variables can be employed.

As noted above, the detector 120 utilizes at least two internal databases 124 and 130, also referred to as DB1 and DB2. As is known in the art, these databases do not need to be separate databases. They can be two tables in the same database, or can even be implemented in standard software, such as C++, without the need of database software. In DB1, a record generally consists of two objects: a fingerprint, and its associated normalization. In DB2, a record generally consists of three objects: a filename (generally, filenames are assumed to include the full pathname, together with the name of the file), an associated index referred to as an ID index, and two associated output parameters, referred to as 'offset' and 'distance.'

One purpose of the ID index is to keep track of which files are identified as duplicates: if, after processing the audio files, two files have the same ID index, then they have been identified as duplicates, whereas if they have different ID indices, then they have been identified as not being duplicates. These databases are normally internal to the system although external databases can be employed. Also, the detector 120 does not need an external database of fingerprints for operations, although the detector typically loads about 2 MB of data in order to compute fingerprints.

When a first audio file is loaded, a fingerprint starting at location T is computed and stored, and the name and location of the file is also stored. Generally, all loaded files have their fingerprints computed, and their name and location stored, although not all files have their fingerprint stored. When a second audio file is loaded, a fingerprint is computed at the location T−S in that file, and this fingerprint is compared against the fingerprint computed from the first file. If there is a match, then the detector 120 notes that the two files contain the same audio by setting their ID index to the same number (the first file processed has ID index set to 0), and then the detector moves on to the next file. If there is not a match, the detector computes a fingerprint for the second file, starting at T−S+D seconds into the file, where D is a step size (e.g., D=186 ms).

In view of the above, audio files can be identified as duplicates even though part of the beginning of one or both of the files may be missing. If a fingerprint F for an audio file is in the database, and a new file is being tested against F, only one of the fingerprints computed in the window (starting at T−S into the file and ending at T+S seconds into the file) need match F in order for a match to be declared. The parameter S may be user selected so that the user can balance the speed of duplicate detection against the robustness against removal of part of the beginning of one or both of the audio files. Speed may also be further enhanced by ordering the comparisons as follows: first check a fingerprint computed at T seconds into the file against the database of fingerprints, then check at T−D seconds, then at T+D, then at T−2D, then at T+2D, etc., until the entire window (of duration 2S seconds) has been checked. In this manner, the most likely locations for matches are checked first, and the system can end the fingerprinting over the slop window when a match is found (called 'bailing' below), thereby speeding up the process.

The above process continues until a match is found or until all fingerprints in the slop window (i.e., fingerprints that start at T−S seconds through those that start at T+S seconds in the second file) have been computed. If a match is found, the detector sets a flag that file 2 is a duplicate of file 1, by setting its ID index equal to that of file 1 in DB2 (in this case, zero), and then "bails" (ceases processing file 2). If no match is found, the detector:

(1) adds the (already computed) fingerprint T seconds into the second file to DB1;

(2) computes and saves the corresponding normalization, and also saves the data in DB1;

(3) sets its ID index to id_index_max, and saves it in DB2; and (4) increments the counter id_index_max. It is noted that id_index_max is typically initialized to 0. In this manner, id_index_max is actually the total number of distinct audio clips found thus far.

In an alternative aspect of the present invention, instead of bailing, the detector 120 computes and compares all the fingerprints in the slop window, in order to find the best matching location in the second file. For example, even though a third computed fingerprint in the second file may match the fingerprint in the first file, a subsequent fingerprint may yield a better match, and thus all fingerprints in the slop window are computed in order to find the best match. This is useful in order to compute how far the fingerprint in the second file was, from where it was expected to be. This analysis in turn indicates that one file has been clipped, with respect to the other, at the beginning of the audio, and also provides the duration of the discarded audio. In this aspect, one of the two output parameters stored in DB2 is the duration, in seconds, of the gap between where the best matching fingerprint was found, and where it would have been had there been no clipping. Also, in this aspect, if a match is found, a second parameter is stored in DB2: the 'distance' associated with the best match. The distance is a measure of how different two compared fingerprints are (and is zero if the two fingerprints are identical), and can therefore be used as a measure of how different the two matched audio files are. For example, the two matched files could be remixes of the same song, and the distance could be correspondingly large, although still below threshold.

Regardless of whether or not bailing is employed, the detector 120 determines whether to declare a match or not, based on distance between stored and computed fingerprints. If the distance falls below a fixed threshold, then a match is declared, and in the alternative aspect, the lowest such distance (computed by comparing all fingerprints in the slop window to all fingerprints in the database) is stored in DB2. One reason that offset and distance are computed in a different routine, rather than always performing the computation, is that it is more computationally expensive (and therefore slower) to compute these quantities, since in order to do so, all fingerprints in the slop window are computed and compared. In the first aspect of the invention where bailing is employed, the detector can bail when a match is found. Although the associated distance and offset could still be saved in this case, the information would likely be less useful, since the offset computed in this manner would be a rough approximation to the true offset, and the distance computed in this manner would only be an upper bound on the true (minimal) distance.

After the above, the detector then iterates in a similar manner through all audio files in the directory tree selected by the user. That is, each audio file is loaded, its fingerprints are computed in the slop window, and if any such fingerprints match any fingerprint already in DB1, then a match is declared and saved as above, otherwise the audio clip is declared to be distinct from all audio clips loaded thus far, and its fingerprint (computed T seconds in) is saved in DB1, its ID index is set to id_index_max in DB2, and id_index_max is also incremented. Also, the audio file normalization is computed and saved in DB1, for comparison with fingerprints corresponding to other yet-to-be-loaded audio clips. In this manner, each file is loaded only once, and only one pass is needed to process the files. After the files have been processed, DB2 is used to output a list of duplicate files to the user interface 160. One way to achieve this is to print all filenames, where 'no blank lines' between filenames indicates that they are duplicates, and a blank line indicates that the file above and below the blank line are not duplicates. In the alternative aspect described above, respective printed filename are followed by its corresponding distance and offset (both zero, for the first file in a list of duplicates).

Figure 2:
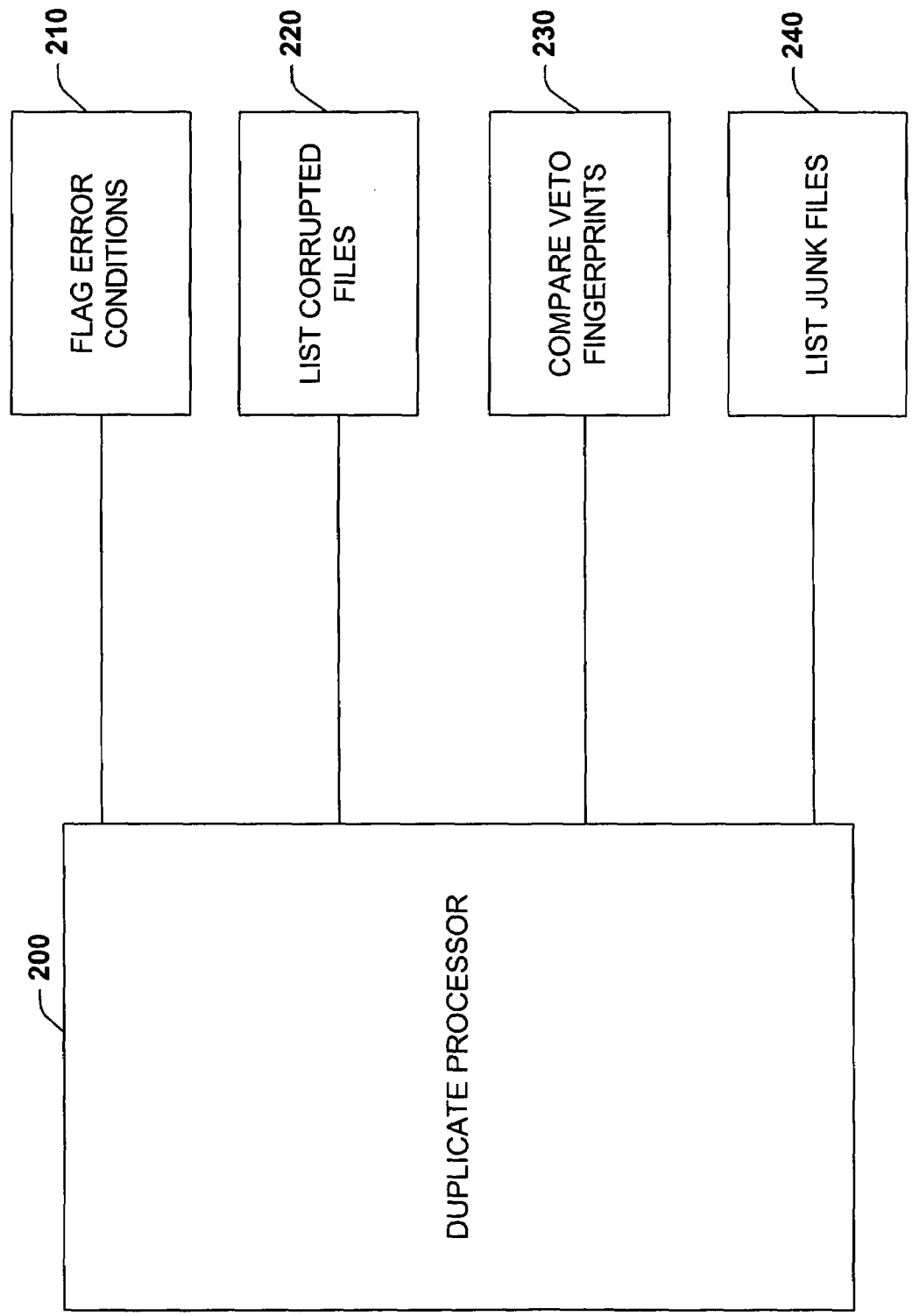
FIG. 2 is a diagram of duplicate processing aspects in accordance with the present invention.

Referring now to FIG. 2, a duplicate processor 200 and associated processing aspects are illustrated in accordance with the present invention. The duplicate processor 200 includes further processing of audio files than previously described above with respect to FIG. 1 to facilitate audio file management. This can include flagging detected error conditions at 210 and listing files associated with such errors at 220. If when attempting to load a file, the file cannot be read, or the header is inconsistent with that expected in an audio file, or some other error condition is encountered, the processor 200 merely makes a note of the error condition for that file, and moves on to the next file. Then, when file processing is complete, the system first outputs the names of the files that it encountered, together with a reason why it could not process the file (e.g., "unsupported sampling rate", or "unable to open due to DRM restrictions"). This list can be output in a single block titled "Corrupted Files" at 220.

Another useful function applies to files that were successfully loaded as audio, but that for example contain noise or some other defect. For each file, before other processing is applied, the fingerprint extracted from that file is compared to a list of "veto" fingerprints at 230, which were previously computed by computing the fingerprints and normalizations for a few special types of audio, such as white noise, or that recorded from a variety of sound cards when they have no input. If the fingerprint for the file in question matches any of these "veto fingerprints", then the file is known to be "junk", and can be flagged as such. Again, when processing of the audio files is complete, these "junk" files can be listed in one block, titled "Junk Files" at 240. In this manner, the system not only finds duplicates, but also can identify other files that the user can check and will probably want to delete.

Figure 3:
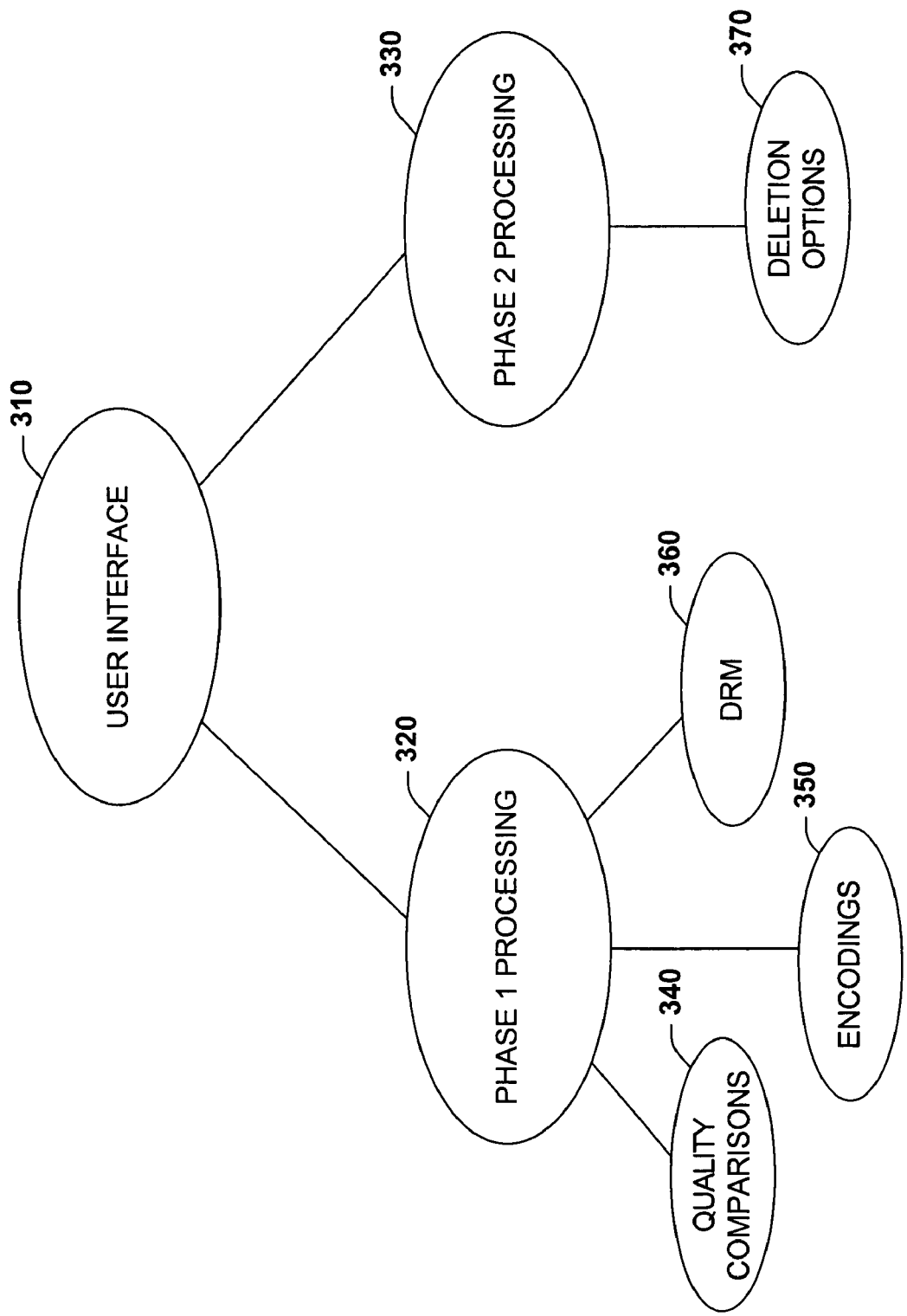
FIG. 3 is a diagram illustrating user interface aspects in accordance with the present invention.

Turning to FIG. 3, user interface processing 300 is illustrated in accordance with an aspect of the present invention. When some duplicates or corruptions for a given file have been found, the system can attempt to compare the duplicates, and offer the user various options as to which one to keep via a user interface 310. The user interface 310 for deletion can be broken into two or more phases. In phase 1 at 320, files are lined up for possible deletion; in phase 2 at 330, the user chooses which of the respective files to actually delete.

Regarding phase 1 at 320, the present invention can: (1) offer the user the ability to keep one or more of the duplicates based on quality comparisons at 340; (2) give preferential treatment to files based on the encoding they use at 350; and/or (3) give preferential treatment based on digital rights management at 360. For example, on quality comparisons 340: if two files have the same encoding type (e.g., they are both WMA, or they are both MP3), and if they have different bit-rates, but they are otherwise similar, then the higher bit-rate (and therefore higher quality) file can be saved (i.e., the other file is lined up for possible deletion). Similarly, if two files have the same encoding type, and are similar in all respects except that one has a longer duration than the other, then the longer duration file can be saved (so that the deleted file will usually be the clipped file). In general, if two files are similar in all respects except one, then the lower quality file will be chosen for possible deletion. Alternatively, if the user's goal is primarily to increase disk space, the user may choose to keep the lower quality, but smaller, files.

Regarding encoding at 350, if one file has encoding type WMA and the other encoding type MP3, then the WMA is likely saved. This addresses the ability of the content/service provider to choose which encoding to favor. For example, one company may prefer the WMA encoding, for various business reasons. Regarding digital rights management at 360, if one file is subject to stronger digital managements rights protections than the other, then the latter may be the file lined up for possible deletion (e.g., if one file is not copyable due to DRM but the other is, then the latter may be lined up for deletion). In this aspect, duplicate detection is being used to 'align' a given song to the strongest DRM constraints that have been agreed to by that user. Of course there may be situations where the user deliberately wants copies of the same song with various strengths of DRM, and that situation can be handled in phase 2 at 330. As can be appreciated, while the above example has been based on two-way comparisons between files, multi-way comparisons can also be applied.

With respect to phase 2 at 330, the user is presented with various choices regarding which files to actually delete at 370, and after confirmation from the user, those files chosen for deletion are deleted. The user can also be presented with various levels of warning, based on how confident the duplicate detector is that the files are in fact duplicates. Furthermore, in phase 2, the user interface 310 could provide the user a 'fast browse' capability to compare two duplicates. For example, suppose that file (A) and file (B) have been found to be duplicates, and that (A) and (B) are similar except that (A) is longer. Since the duplicate detector can, by the way it operates, determine where the matching fingerprints are in the two copies, and since it determines the total duration of each piece of audio, it knows whether (A) is longer than (B) at the beginning, or whether (A) is longer than (B) at the end, or both. Then the user interface 310 can play that part of file (A) which is very likely not included in file (B), and the user can determine if in fact they desire to keep the longer of the two files (e.g., they may prefer the shorter of the two if the difference is just applause or silence).

Furthermore, if the user is unsure as to whether the two files are really duplicates, and does not want to have to listen to each one separately, then they can request that the duplicate detector be run again on both files again, but this time using many fingerprints at different locations, to determine which parts of the two files are in fact duplicated. For example, if one file is three times longer than the other, it may be that they are identical only at the beginning. In this way the user interface 310 can call the duplicate detector again, to gain further information on specific files, which would be too computationally expensive to compute during the initial run of the duplicate detector on all the user's audio files. It is noted, that all of the above aspects of detection can be employed to identify duplicates of videos (e.g., by searching for duplicates of the audio tracks).

Figure 4:
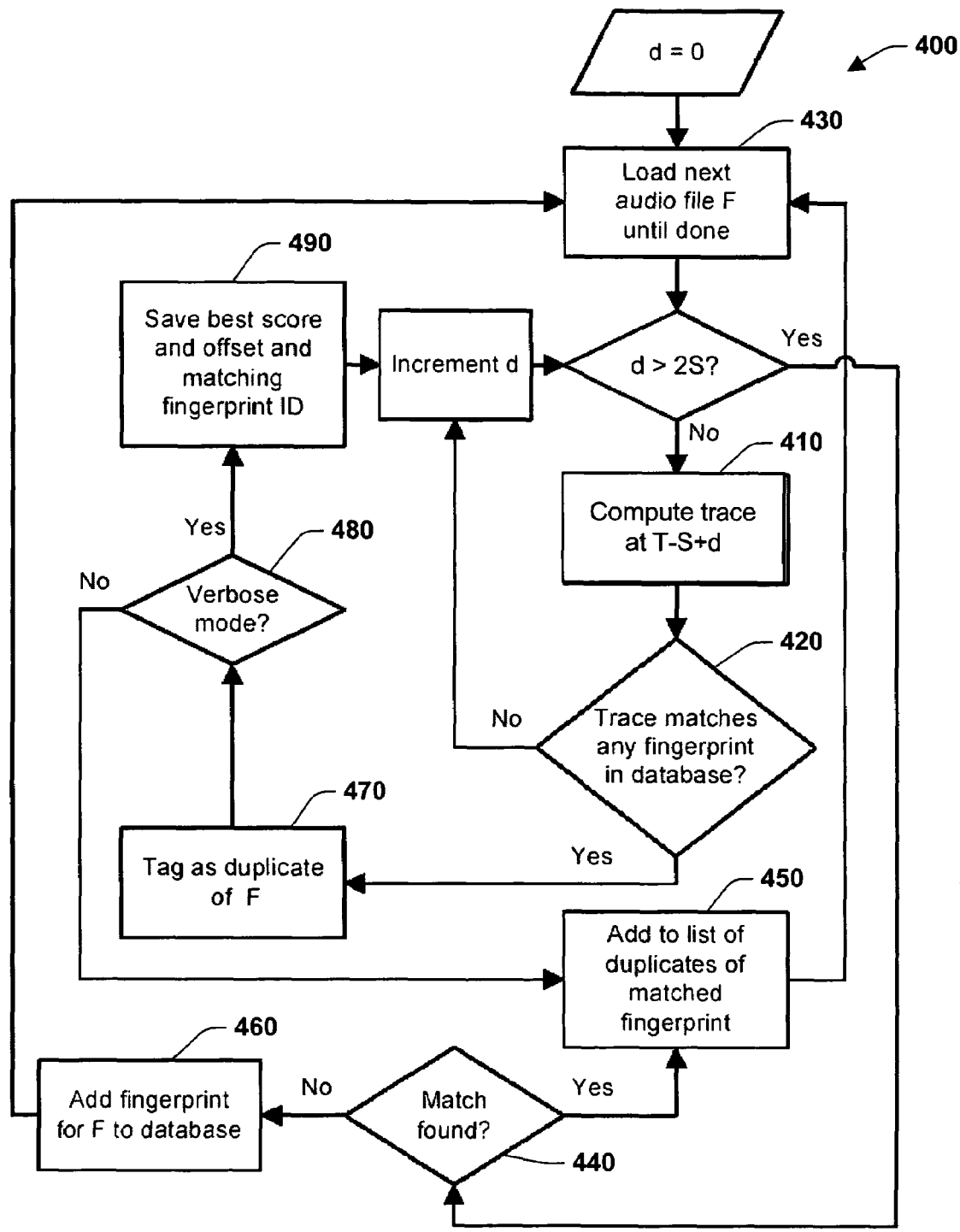
FIG. 4 is a flow diagram illustrating audio duplicate processing in accordance with an aspect of the present invention.

FIG. 4 is a flow diagram illustrating audio duplicate processing in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

A Robust Audio Recognition Engine (RARE) duplicate detector DupDet can operate in accordance with the basic process 400 of FIG. 4, recursively processing audio files in a directory tree, for example. For each created fingerprint, a normalization factor is also created, so that a mean Euclidean distance from that fingerprint to a large collection of fingerprints computed from other audio files is one. This is performed so that distances computed between pairs of fingerprints can be usefully compared.

The process 400 creates a set of traces for each file, and checks it against a set of fingerprints created for the other audio files. Here, the term 'trace' is used for a fingerprint computed from the file being tested against the database, and 'fingerprint' is used for those fingerprints stored in the database. If $D(\bullet, \bullet)$ (distance) between a trace and a fingerprint falls below a threshold, the associated audio files are declared to be duplicates. For each file, the fingerprints are computed at a fixed location T in the file, and the traces are computed in a search window S around T at 410; wherein S and T are user defined.

The process 400 can concurrently create fingerprints and check for duplicates in one pass, as indicated at 420. When a first audio file is read at 430, a 6s fingerprint at location T is computed and saved. When a second audio file is loaded, traces that begin in the window T−S to T+S are computed at 410 in time order (each trace computed ⅙ s after the previous one). If one of these traces is a match at 440, the file is declared a duplicate and added to the list of duplicates for that fingerprint at 450. If no match is found for the entire set of traces in the search window, then the fingerprint (already computed at location T in the audio) is saved in the database at 460, representing a (so far) unique clip. The system also uses 6 'veto fingerprints,' (or other number) which are fingerprints collected from noise (e.g., silence, sound cards with no input, and so forth). Audio files that match a veto fingerprint can also be labeled as 'junk files.' As illustrated, matches can be tagged as duplicates at 470, and other processing can occur at 480 and 490 relating to saving best match scores, offsets, and matching fingerprint ID's.

Figure 5:
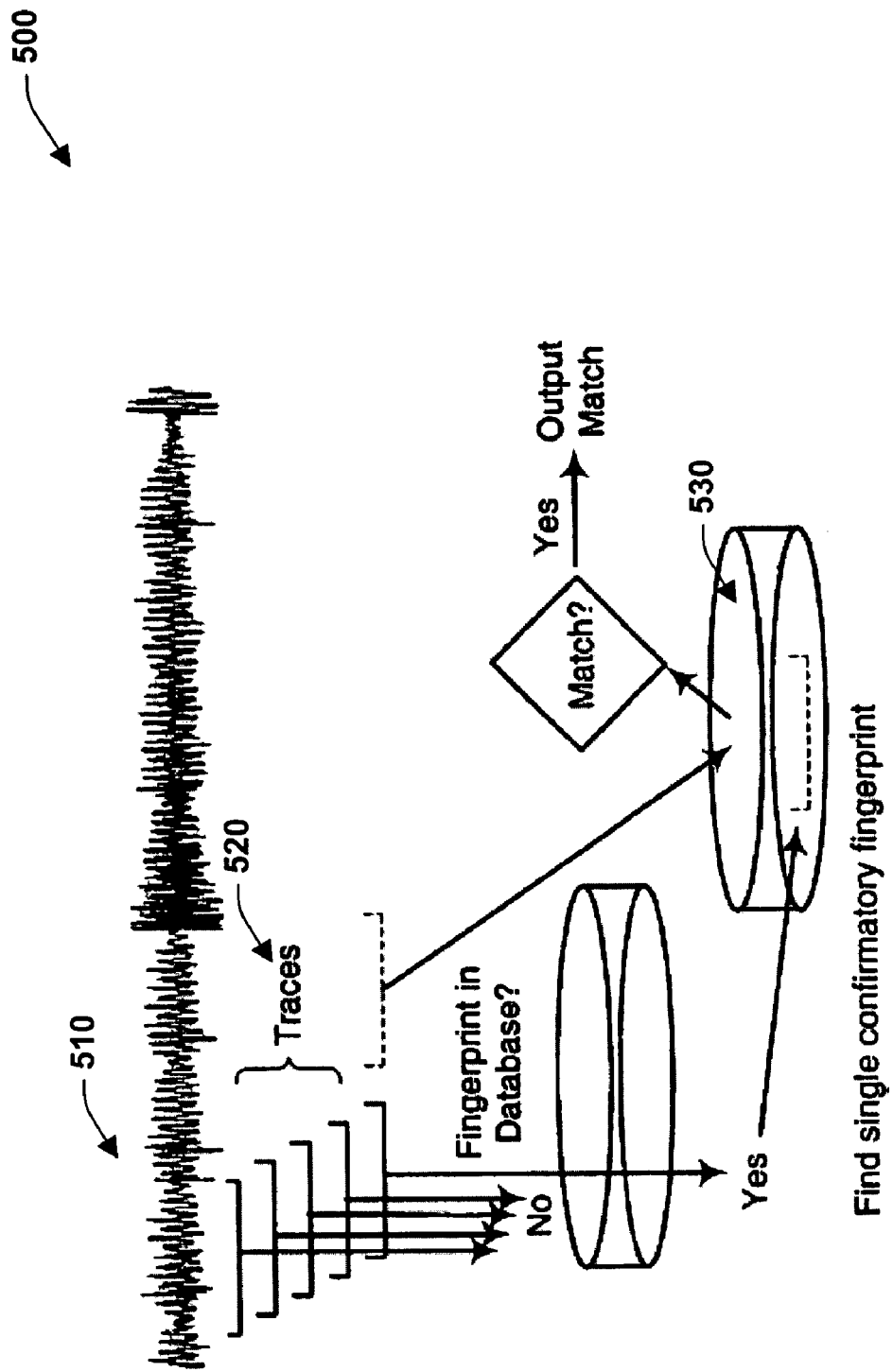
FIG. 5 is a diagram illustrating an audio fingerprinting system in accordance with an aspect of the present invention.

FIG. 5 illustrates an audio fingerprinting system 500 in accordance with an aspect of the present invention. In stream audio fingerprinting (SAF), the task is to identify audio segments in an audio stream, where the stream may have been corrupted by noise. The system 500 of FIG. 5 shows the overall setup. A fixed-length segment of an incoming audio stream 510 is first converted into a low-dimensional trace at 520 (a vector, shown as an interval). This input trace 520 is then compared against a large set of stored, pre-computed traces (fingerprints) at 530, where each stored fingerprint has previously been extracted from a particular audio segment (for example, a song).

The input traces 520 are computed at repeated intervals in the stream 510 and are compared with the database 530. An input trace that is found in the database can then be confirmed, at negligible additional computational cost, by using a secondary fingerprint. Typical applications include identifying broadcast audio, for example for royalty assessment, or to confirm that commercials were aired as a service to the sponsor; enabling a software player to identify tracks on user-generated CDs; finding metadata for unlabeled audio; or automatically detecting duplicates in large audio databases. The present invention can employ an algorithm called Distortion Discriminant Analysis (DDA) for automatically extracting noise-robust features from audio. DDA features are computed by a linear, convolutional neural network, where each layer performs a version of oriented Principal Components Analysis (OPCA) dimensional reduction.

In order to build robustness against distortions, DDA assumes that distorted versions of a set of training signals are available. Requiring samples of distorted signals is less stringent and more general than requiring that the real noise model is known. DDA generally does not assume that the distortion is additive: nonlinear distortions are also handled. While it may be useful to be able to train for specific distortions that are expected in test phase, DDA can be generalized, in that it is robust to distortions that are not used for training. Pre-computed traces are called "fingerprints," since they are used to uniquely identify the audio segment. Typically, one or two fingerprints per audio clip would be used although error rates can be further reduced by using more fingerprints. Also, in the following description, some mathematical background is given, wherein vectors are denoted in bold font and their components in normal font, and prime denotes transpose.

Given a set of vectors $x_i \in R^d$, $i=1, \ldots, m$, where each $x_i$ represents a signal (here and below, undistorted data will be referred to as "signal" data), and suppose that for each $x_i$ one has a set of N distorted versions $\tilde{x}_i^k$, $k=1, \ldots, N$. Define the corresponding difference vectors $z_i^k \equiv \tilde{x}_i^k - x_i$ (referred to as "noise" vectors below). Generally, it is desired to find linear projections which are as orthogonal as possible to the $z_i^k$ for all k, but along which the variance of the original signal $x_i$ is maximized. Denote the unit vectors defining the desired projections by $n_i$, $i=1, \ldots, M$, where M will be chosen by the user. The discussion can be simplified by choosing M=1 temporarily.

A feature extractor n can be constructed which minimizes the mean squared reconstruction error $(1/mN)\Sigma_{i,k}(x_i - \hat{x}_i^k)^2$, where $\hat{x}_i^k \equiv (\tilde{x}_i^k \cdot n)n$. It is straightforward to show that the n that solves this problem is that eigenvector of $R_1 - R_2$ with largest eigenvalue, where $R_1$, $R_2$, are the correlation matrices of the $x_i$ and $z_i$ respectively. However, this feature extractor has the undesirable property that the direction n will change if the noise and signal vectors are globally scaled with two different scale factors. Instead, OPCA (Oriented PCA) directions are defined as those directions n that maximize the generalized Rayleigh quotient $$q_0 = \frac{n' C_1 n}{n' C_2 n} \quad (1)$$

where $C_1$ is the covariance matrix of the signal and $C_2$ that of the noise. However, in contrast to the original form of OPCA, a correlation matrix of the noise is used rather than the covariance matrix, since it is desired to penalize the mean noise signal as well as its variance. Explicitly, take $$C \equiv \frac{1}{m}\sum_i (x_i - E[x])(x_i - E[x])' \quad (2)$$

$$R \equiv \frac{1}{mN}\sum_{i,k} z_i^k (z_i^k)' \quad (3)$$

and maximize the generalized Rayleigh quotient $$q = \frac{n' C n}{n' R n}. \quad (4)$$

The numerator in (4) is the variance of the projection of the signal data along the unit vector n, and the denominator is the projected mean squared "error" (the mean squared modulus of all noise vectors $z_i^k$ projected along n).

The directions $n_j$ can be found by setting $\nabla q = 0$, which gives the generalized eigenvalue problem:

$$q = qRn. \quad (5)$$

It is straightforward to show that:
1) for positive semidefinite C, R (as is the case here), the generalized eigenvalues are positive. However if R is not of full rank, it is regularized for the problem to be well-posed;
2) scaling either the signal or the noise leaves the OPCA directions unchanged, although the eigenvalues will change;

3) the $n_i$ are, or may be chosen to be, linearly independent;
4) although the $n_i$ are not necessarily orthogonal, they are conjugate with respect to both matrices C and R;
5) q is maximized by choosing n to be the highest weight generalized eigenvector.

For high dimensional data such as audio, OPCA can be applied in layers. Consider, for example, the extraction of a 64 dimensional fingerprint from 6 s of audio the audio signal is converted to mono and down sampled to 11 025 Hz, the subsequent feature extraction maps a vector of dimension 66 150 to a vector of dimension 64. Directly solving the generalized eigenvalue problem in this case is infeasible. Instead, OPCA can be applied in two layers, where the first layer operates on a log spectrum computed over a small window and the second layer operates on a vector computed by aggregating vectors produced by the first layer. This approach is referred to as "Distortion Discriminant Analysis" (DDA). DDA is a linear method; the projections that occur in a given layer may be viewed as a convolution. Thus, DDA may be viewed as a linear, convolutional neural network, where the weights are chosen using OPCA.

In DDA, each subsequent layer sees a wider temporal window than the last: the eigen-directions found for that layer are suited to that particular temporal scale. This is a feature of DDA; for example, it can be used to compensate for alignment noise, which is defined to be the noise resulting from the fact that a stored fingerprint can be temporally out of phase with the input traces. In the worst case, the fingerprint will have been computed from a frame which lies half way between the two frames used to compute two adjacent input traces. Compensation for such temporal distortions in a DDA system should be applied on the last layers, since they see the widest temporal windows.

DDA not only makes the test phase computationally efficient, and allows the compensation of distortions at different time scales; it is also efficient in the training phase. The required covariance and correlation matrices can be computed one vector at a time, if desired. These matrices can thus be estimated using an arbitrarily large amount of data. After the matrices are estimated, the generalized eigenvalues can be computed with standard numerical linear algebra packages.

Figure 6:
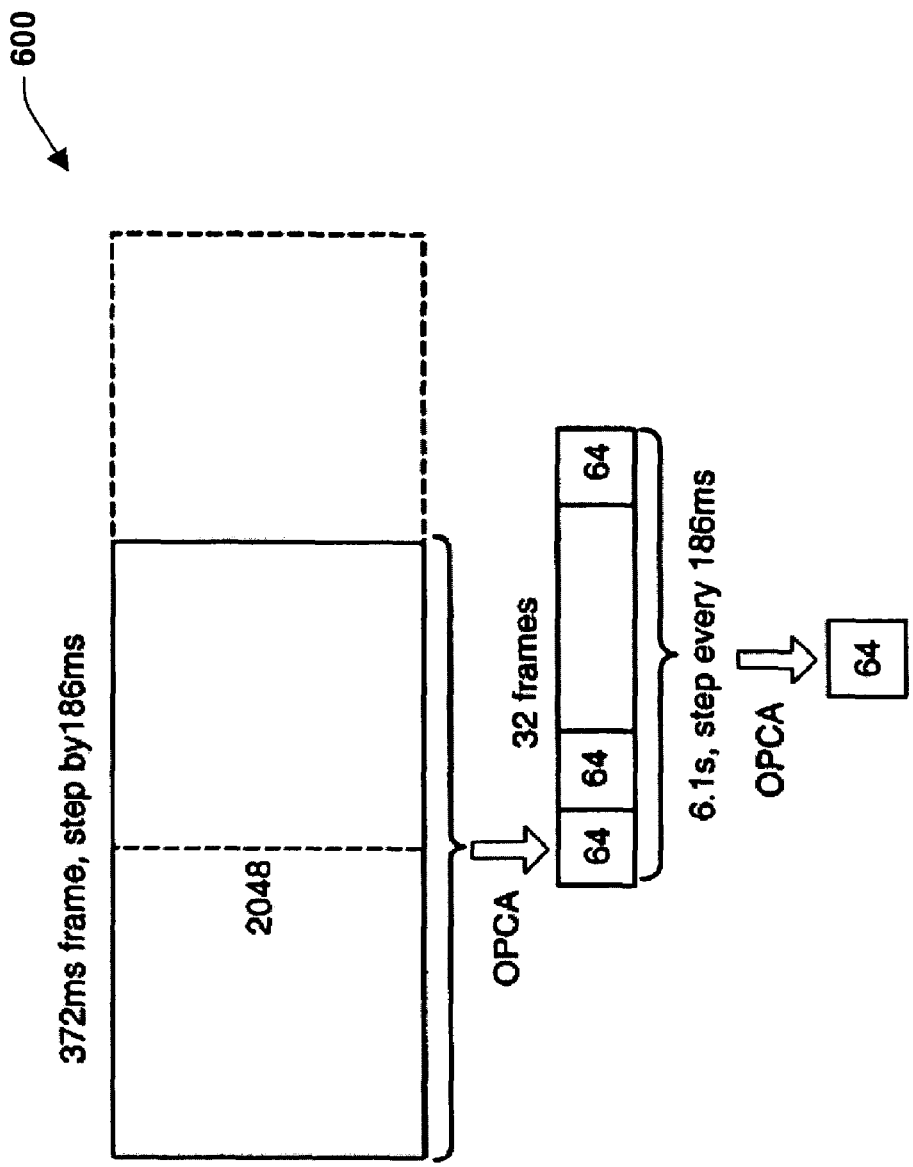
FIG. 6 is a diagram illustrating distortion discriminate analysis in accordance with an aspect of the present invention.

FIG. 6 illustrates a distortion discriminate analysis system 600 in accordance with an aspect of the present invention. Techniques for audio processing, for example that of extracting features from speech, often use frame durations of order 20 ms. However, in order to reduce computational overhead for the fingerprinting application, it is desirable to generate traces from a stream at about a few times per second. For 20 ms input frames, the step sizes used in the last DDA layer would have to sample at less than the initial sampling rate of 100 Hz, and this can cause aliasing, which will act as a further source of distortion. The system 600 shown in FIG. 6 avoids this problem. There is generally no aliasing since there are no intermediate layers with reduced sampling rate. Because of this requirement, and the requirement that traces be generated at a time scale on the order of about one half second, considerably constrains the possible durations of the first layer frame. Also, the temporally wide first layer allows DDA greater flexibility in choosing the important directions in frequency space.

Figure 7:
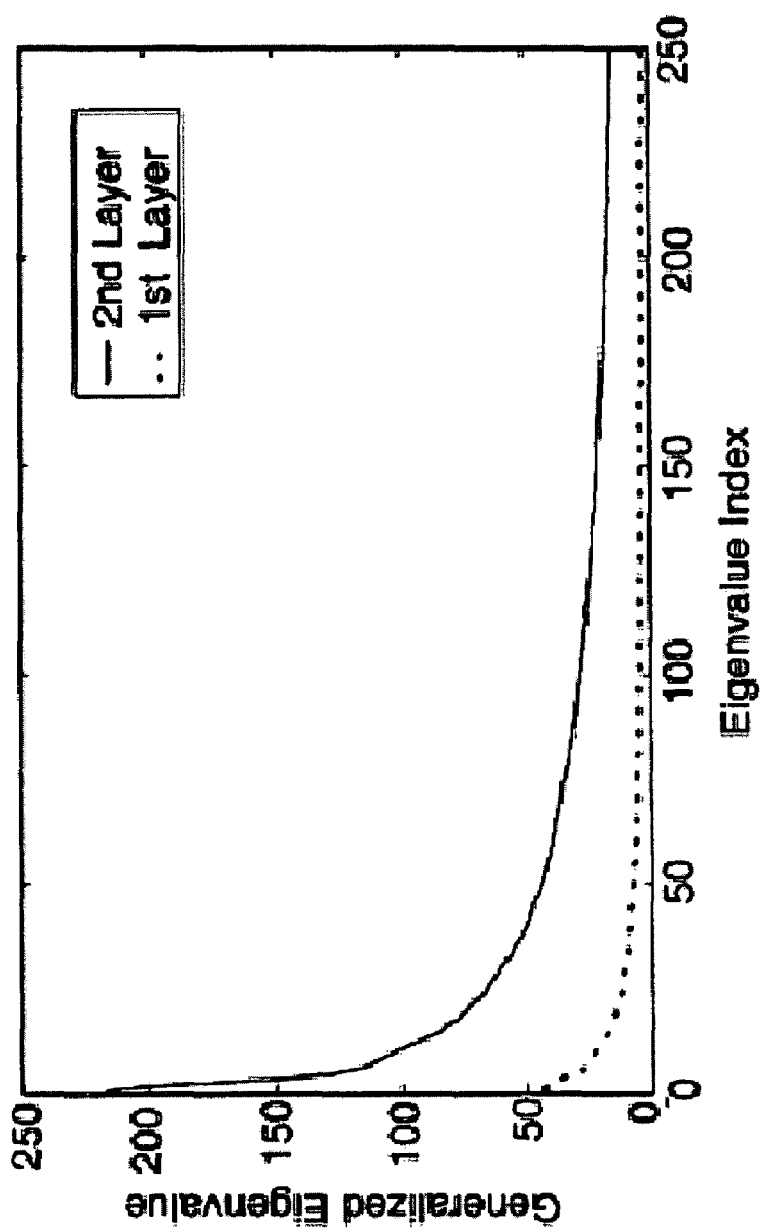
FIG. 7 is a diagram illustrating generalized eigenvalues in accordance with an aspect of the present invention.

FIG. 7 illustrates generalized eigenvalues 700 in accordance with an aspect of the present invention. The choice of 64 output dimensions for the first layer of the system 600 described above is guided by the measured generalized eigenspectra on the training data, shown in FIG. 7. Most of the useful information from the first layer is captured in the first 100 projections. The spectrum on the second layer drops off less rapidly. However, to speed up the database lookup, only the top 64 projections on the second layer were considered. The speed of the database lookup could be further increased by a factor of two by only sampling the output every 372 ms rather than every 186 ms.

The stream audio fingerprinting system described above first converts a stereo audio signal to mono and then down samples to 11 025 Hz. The signal is split into fixed-length, 372 ms frames which overlap by half. An MCLT (an overlapping windowed Fourier transform) is then applied to each frame. A log spectrum is generated by taking the log modulus of each MCLT coefficient. The stream audio fingerprinting system performs two per-frame preprocessing steps that suppress specific, easy-to-identify distortions.

The first preprocessing step removes distortions caused by frequency equalization and volume adjustment. This "de-equalization thresholding" step applies a low-pass filter to the log spectrum by taking the DCT of the log spectrum, multiplying each DCT coefficient by a weight which ramps linearly from 1 for the first component to 0 for the sixth and higher components, and then performing an inverse DCT. This results in a smooth approximation A to the log spectrum. A is then uniformly lowered by 6 dB and clipped at −70 dB. The output vector of the first preprocessing step is then the component-wise difference between the log spectrum and if that difference is positive, else zero.

The second preprocessing step removes distortions in the signal that cannot be heard by a human listener. This step exponentiates the log spectrum from the first step, then generates a frequency-dependent perceptual threshold by an algorithm. The final preprocessed signal is then the difference in dB between the log spectrum and the log perceptual threshold, if that difference is positive, and zero otherwise. The final preprocessed data consists of 2048 real coefficients (and thus 2048 bands) per frame.

Figure 8:
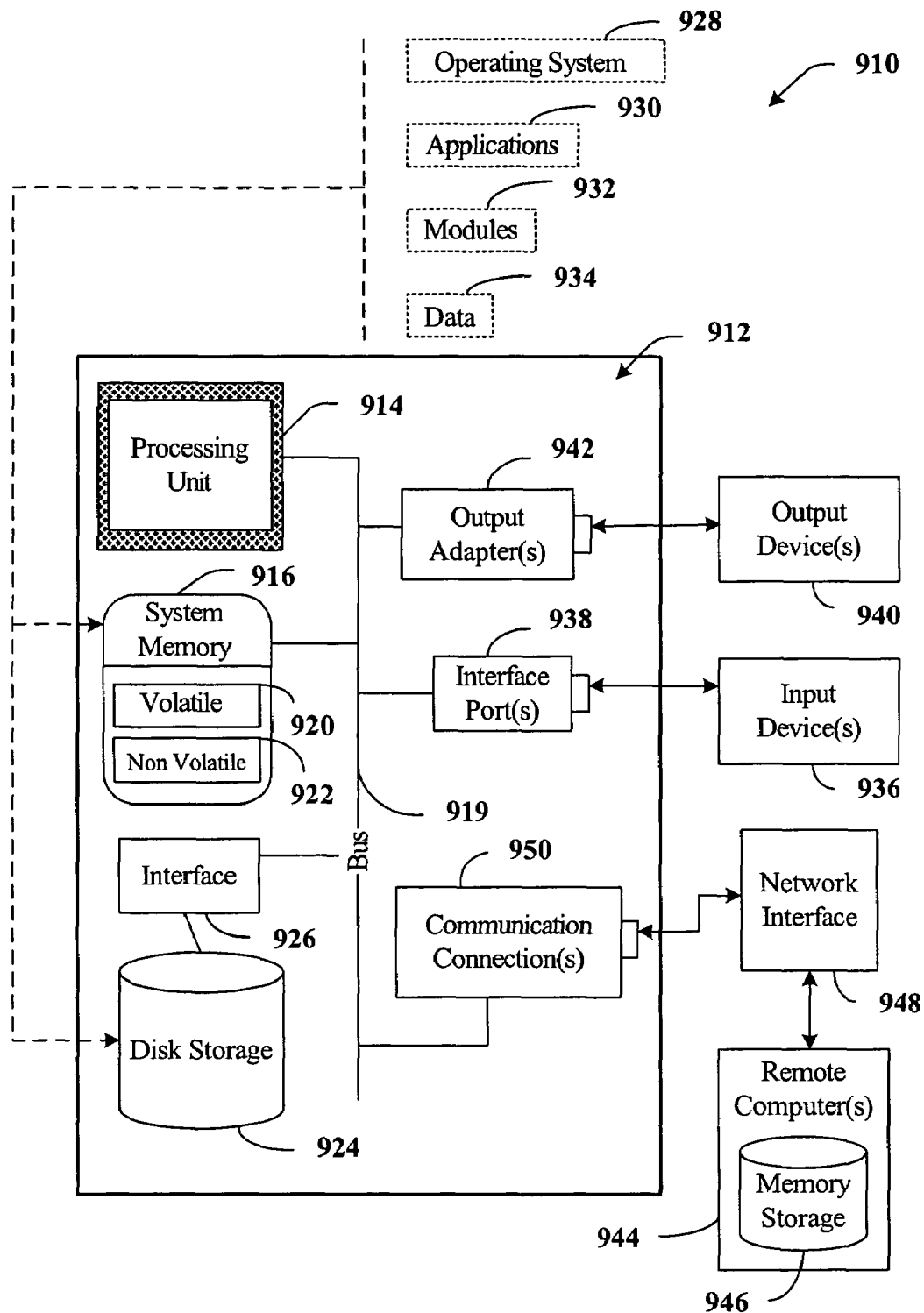
FIG. 8 is a schematic block diagram illustrating a suitable operating environment in accordance with an aspect of the present invention.

With reference to FIG. 8, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 8 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 8 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/ software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 9:
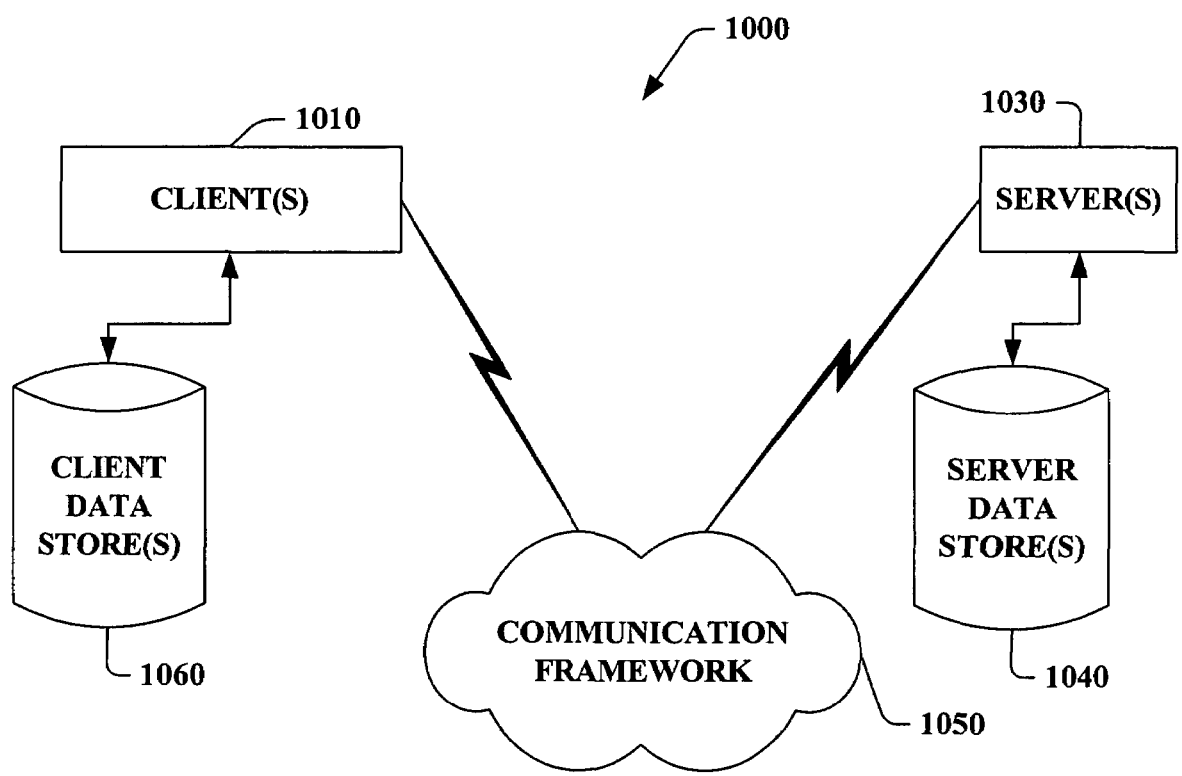
FIG. 9 is a schematic block diagram of a sample-computing environment with which the present invention can interact.

FIG. 9 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for managing audio information, comprising:
a fingerprinting component that maps portions of a plurality of audio files to corresponding fingerprints;
a detector that tags one or more of the audio files for potential removal from a data storage device based in part upon a distance between the fingerprints; and
a database for storing veto fingerprints that are employed to identify noisy audio files.

2. The system of claim 1, the detector tags the audio files based upon the distance between fingerprints being below a predetermined threshold.

3. The system of claim 1, the fingerprinting component further producing a plurality of fingerprints for a file, the plurality of fingerprints corresponding to a time window of audio in the file, and wherein the detector tags the audio files based upon a lowest distance between the plurality of fingerprints and one or more stored fingerprints for each file.

4. The system of claim 3, the fingerprinting component is disposed to accept a time offset into the audio file and a duration of a time window in the files.

5. The system of claim 4, the detector computes and compares all fingerprints in a time window, in order to find a best matching location in a file that has already been processed.

6. The system of claim 5, the detector is employed for determining an identity of an audio file.

7. The system of claim 6, the identity is composed of metadata associated with an audio file.

8. The system of claim 1, the fingerprint component computes fingerprints that are generated from more than one second of audio, and that consist of about 64 floating point numbers.

9. The system of claim 1, the detector utilizes at least two internal databases referred to as DB1 and DB2, in DB1, a record comprises a fingerprint and associated numerical quantities including a normalization factor, in DB2, a record includes at least four objects: a filename, an associated index referred to as an ID index, an 'offset' parameter and a 'distance' parameter.

10. The system of claim 1, further comprising a database that is employed to output a list of duplicate or defective audio files to a user interface.

11. The system of claim 10, the detector logs error conditions while processing the audio files and outputs a list of files associated with the error conditions to the user interface.

12. A computer readable medium having computer readable instructions stored thereon for implementing the fingerprinting component and the detector of claim 1.

* * * * *